United States Patent [19]

Chlebek et al.

[11] Patent Number: 5,513,395
[45] Date of Patent: May 7, 1996

[54] TOILET WITH MAGNETIC CHECK VALVE

[75] Inventors: Kevin B. Chlebek, Dundee; James K. Miller, Ypsilanti, both of Mich.

[73] Assignee: Thetford Corporation, Ann Arbor, Mich.

[21] Appl. No.: 294,311

[22] Filed: Aug. 23, 1994

[51] Int. Cl.⁶ ........................................ E03D 1/24
[52] U.S. Cl. .............................. 4/329; 137/529; 251/65
[58] Field of Search ........................... 4/321–323, 329, 4/332; 137/529; 251/65

[56] References Cited

U.S. PATENT DOCUMENTS

| | | | |
|---|---|---|---|
| 2,938,540 | 5/1960 | Schatzman et al. | 251/65 X |
| 3,270,763 | 9/1966 | Kiefer | 251/65 X |
| 3,354,898 | 11/1967 | Barnes | 251/65 X |
| 3,850,189 | 11/1974 | Follett | 251/65 X |
| 4,180,876 | 1/1980 | Sargent et al. | 4/321 |
| 4,273,153 | 6/1981 | Brown | 251/65 X |
| 4,926,508 | 5/1990 | Sargent et al. | |
| 5,010,602 | 4/1991 | Sargent et al. | |

*Primary Examiner*—Charles E. Phillips
*Attorney, Agent, or Firm*—Harness, Dickey & Pierce

[57] ABSTRACT

A toilet having a seat section that includes a bowl with a bottom discharge opening. The toilet also includes a source of flush water for rinsing the bowl and removing waste through the discharge opening into a waste storage tank. A pump provides the flush water through a nozzle which directs the flush water into the bowl. A check valve is associated with discharge nozzle to prevent flush water from inadvertently leaking into the bowl. The check valve is capable of being used with either a manually actuated pump or a power assisted pump and reduces the force required by the pump to maintain the valve open than to initially open it.

8 Claims, 3 Drawing Sheets

TOILET WITH MAGNETIC CHECK VALVE

BACKGROUND OF THE INVENTION

This invention relates generally to portable toilets and recreational vehicle toilets. More particularly, the invention relates to a toilet incorporating a flush assembly that in which, a reduced amount of pressure to achieve proper flushing of the toilet is a desirable characteristic.

It is conventional practice when flushing toilets of the type to which this invention relates to utilize either manually operable pump or a battery operated pump for pumping fresh flush water from a flush water source into the toilet bowl. Manual pumps are low cost items which often employ bellows. In a bellows operated pump, it is typically necessary for the user to apply about a thirty-five pound of force to the bellows to operate the pump. If the force is too hard or sudden, flush water is shot out of a discharge nozzle and out of the toilet bowl. If an insufficient force is applied to the bellows, a less than satisfactory flush is obtained. While manual pumps have proven satisfactory for the needs of some users, handicapped, elderly and young persons generally do not have the physical strength or ability to operate a bellow pump. For these users, power assisted flush assemblies have been developed.

An electric or power assisted flush assembly requires less force on the actuator than a manual pump and achieves repeated uniform wetting and thorough flushing of the toilet's bowl while providing for an efficient use of the flush water supply. U.S. Pat. No. 4,926,508 illustrates a toilet which incorporates a power assisted flush assembly.

Part of the reason for the amount of flushing force which is necessary is that a check valve is typically incorporated into the discharge nozzle to prevent inadvertent leaking of flush water from the source. Check valves generally use a coil or compression spring to force a valve disc into sealing engagement with a valve seat. Because of the spring, the amount of force necessary to open the check valve is less than the force needed to maintain it open. Thus, the required force to maintain the valve open increases as the valve disc is disengaged or unseated from the valve seat.

In toilets having manually operated flush mechanisms, such a restriction is not objectionable because the same large force that is necessary to operate the flush mechanism is sufficient to initially open the check valve and maintain it open until flushing is completed. However, this resistance is often of a magnitude that results in the quick depletion of the battery source or power of the assisted flush assembly. One objective of a power assisted flush assembly is therefore to use as little power as possible during flushing so as not to significantly drain the power source. In fact, in some power assisted flush assemblies this has led to the replacement of the check valve with a manually operated valve, formed with the flush assembly so as to operate off of the "push" force required to actuate flushing itself. This again poses a problem for the elderly, the young and other persons who generally do not have the physical strength or ability to operate the mechanical aspect of the pump.

The above mentioned manual valve normally remains closed and is incorporated into the pump. The valve is manually opened during initiation of a flush by the same actuator movement that closes the switch that in turn initiates the power assisted flush. Unfortunately, this valve increases the complexity of the flushing assembly and requires eliminating the check valve from an otherwise identically setup toilet, further increasing the production costs.

In view of the above limitations, it is a principal object of this invention to provide a RV toilet which requires a reduced flushing force with either a manual pump or a power assisted pump.

Another object of the invention is to incorporate a check valve with minimum flow restrictions into a toilet which is equally usable with either a manually operable pump assembly or a power assisted pump assembly.

Yet another object of this invention is to provide a toilet which has an improved flushing action, a more efficient use of flush water and which allows for more efficient use of the power supply when equipped with a power assisted pump assembly.

Still another object of the present invention is to provide a toilet having a check valve which requires less force to maintain open than it does to initially open.

A further object of this invention is to provide a toilet with a check valve that does not rely on a spring to maintain the check valve assembly in its closed position.

It is also an object of this invention to provide a toilet with a check valve that utilizes a magnet to maintain the check valve assembly in its closed position.

SUMMARY OF THE PRESENT INVENTION

The present invention is directed to a new and improved RV toilet which requires less flushing force than prior designs. The toilet includes a seat section with a bowl having a bottom discharge opening. The toilet also includes a source of flush water, such as a flush water storage chamber, from which flush water is delivered, and a waste holding tank into which waste from the bowl is received. A manual, electric, power assisted or other pumping mechanism delivers fresh flush water from the flush water source through a flush tube and discharge nozzle into the bowl. The pumping mechanism provides the flush water at a pressure and rate which is sufficient to open a check valve in the discharge line and which ensures a "good" flush with 100% bowl coverage by the flush water.

The check valve prevents flush water from leaking, spilling or otherwise inadvertently passing from the source of flush water into the bowl. A passageway is defined through the body of the check valve and a valve seat defines an orifice through which the flush water must flow. Movably mounted within the passageway is a plunger. The plunger is adapted to sealingly engage the valve seat and is movable between a position where it is seated with the valve seat (preventing the flow of flush water through the valve assembly) and a position where it is disengaged from the valve seat (permitting flush water to pass through the valve assembly).

Instead of the typical compression spring which is used to bias a valve disc into engagement with the valve seat, the present invention uses a magnet and striker pin to maintain the plunger and valve seat in their engaged position. By utilizing this magnetic biasing mechanism, less force is required to maintain the valve open than to initially open it. This feature enables a toilet to be equipped with either a manually operated or a power assisted pumping mechanism without requiring additional modifications to the toilet or pumping mechanism and resulting in reduced production costs.

Additional benefits and advantages of the present invention will become apparent to those skilled in the art to which this invention relates from the subsequent description of the

DETAILED DESCRIPTION OF THE PREFERRED EMBODIMENTS

Figure 1:
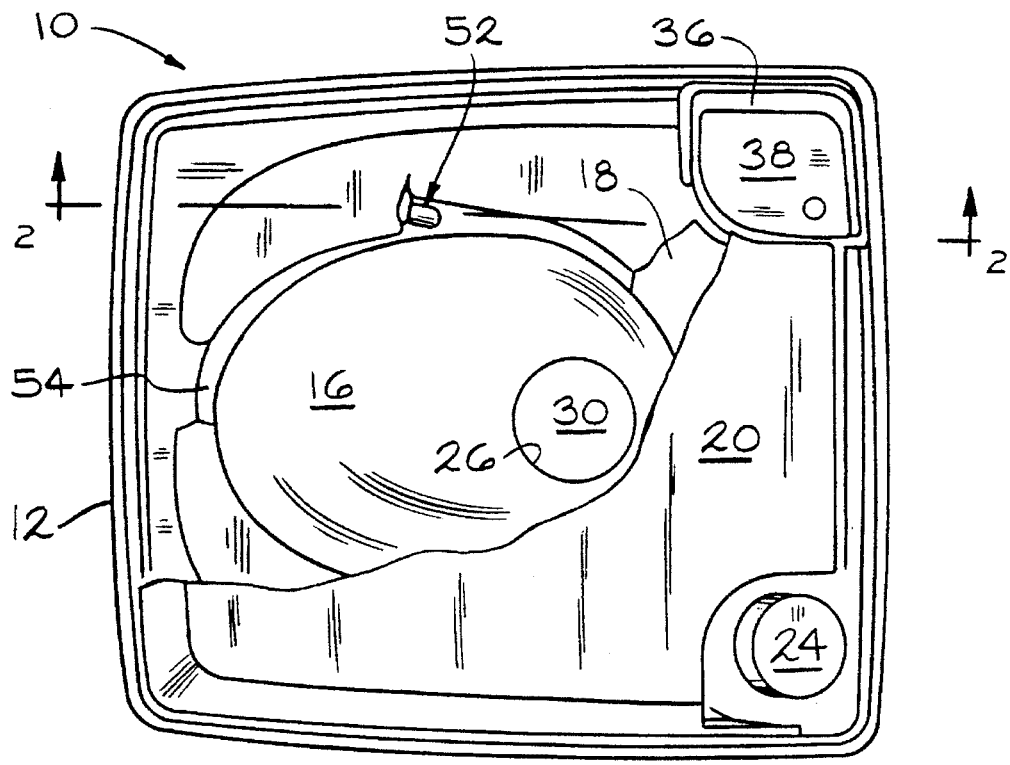
FIG. 1 is a top plan view with portions broken away of a toilet embodying the principles of the present invention.
Figure 2:
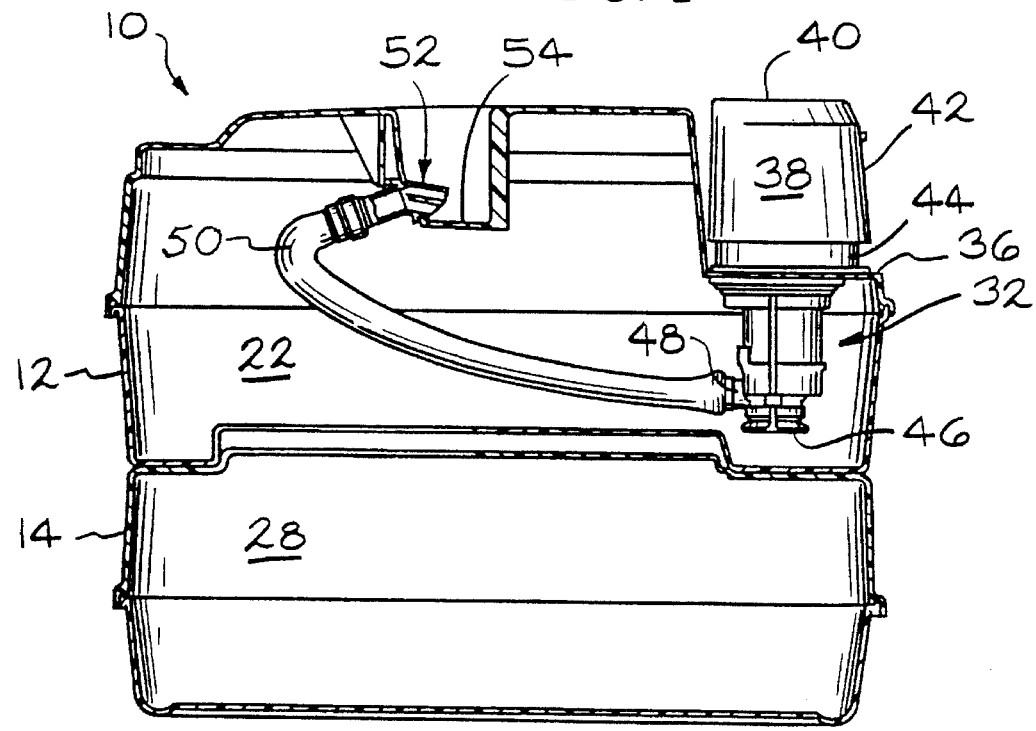
FIG. 2 is a sectional view taken substantially along line 2—2 in FIG. 1.

Referring now to the drawing, an improved toilet according to the principles of the present invention is generally illustrated in FIGS. 1 and 2 and designated at 10. While the toilet 10 is illustrated as a portable toilet, the present invention is not intended to be so limited and will have equal applicability to non-portable and semi-portable toilets as well. The toilet 10 includes a seat section 12 which separably mounts onto a holding tank section 14 in a well-known and conventional manner. The seat section 12 includes a bowl 16, an overlying seat 18 and a cover 20. The seat 18 and cover 20 are hingedly mounted to the rear of the seat section 12. A storage tank or chamber 22 for fresh flush water is provided within the interior of the seat section 12 and the storage chamber 22 can be filled with fresh flush water via a fill port covered by a removable cap 24. Alternatively, the flush water can be provided from an exterior or other source instead of the chamber 22.

The toilet bowl 16 is provided with a discharge opening 26 that is located at the bottom of the bowl 16 so as to be in registry with an opening (not shown) in the holding tank section 14 when the two sections are mounted to one another. The discharge opening 26 permits waste to be transferred from the bowl 16 into a waste receiving chamber 28 defined in the holding tank section 14. When the toilet 10 is not being used, the discharge opening 26 is occluded by a disk or other type of closure valve 30 that can be manipulated by the user of the toilet.

A manual, electric or power assisted pumping mechanism 32 is provided to pump fresh flush water from the flush water source 22 into the bowl 16 in order to remove waste from the bowl 16. The pumping mechanism 32 is mounted on the seat section 12 in an upwardly facing opening 34 in what is illustrated as the right rear upper corner 36 of the seat section. An O-ring, gasket or other sealing method (not shown) provides for a fluid tight seal around the opening 34 when the pumping mechanism 32 and the seat section 12 are connected together. The upper portion of the pumping mechanism 32 includes an actuator cap 38 which has a top wall 40 and a depending skirt 42. Telescoped over a housing portion 44, the actuator cap 38 is depressed to manipulate the flushing mechanism 32 and initiate flushing. The actuator cap 38 is sometimes referred to as a "palm button" because it is intended to be depressed with the palm of the user's hand.

The pumping mechanism 32 itself is of a well-known and conventional design. For example, the pumping mechanism 32 may be a fully manually actuated pump incorporating a bellow or, alternately, the pumping mechanism 32 can be an electrically powered pump. The pumping mechanism 32 illustrated in FIG. 2 is of the latter variety. Since the pumping mechanism 32 conforms one of many well-known constructions, its specific details need not be further described herein.

Regardless of the type of pumping mechanism 32 which is provided with the toilet 10, the mechanism 32 will include an inlet 46 through which flush water is drawn and an outlet 48 through which flush water is expelled. Connected to the outlet 48 is a flush conduit or tube 50 which delivers the flush water to a discharge nozzle 52 where it is directed into the bowl 16 of the toilet 10.

More specifically, the discharge nozzle 52 is oriented so that flush water is directed into and around the perimeter of the toilet bowl 16, causing thorough wetting of the entire bowl surface. To assist in wetting the entire bowl surface and ensure that all of the contents of the bowl 16 are flushed through the discharge opening 26 into the waste receiving chamber 28 of the holding tank section 14, the bowl 16 is provided with a flush ledge 54. The flush ledge 54 extends around the upper perimeter of the bowl 16 causing discharged flush water to flow along the ledge 54. A portion of the flush water flows inwardly off of the ledge 54 wetting all of the surfaces around the bowl 16.

As mentioned above, check valves have typically been provided either adjacent to the discharge nozzle or in line with the flush tube so as to prevent the inadvertent passing of flush water through the tube. Check valves have commonly included a compression spring that biased a valve disc into engagement with a valve seat when the toilet was not being flushed. Obviously, with the compression spring, as the valve disc is unseated from the valve seat, the pressure required to further move the valve disc away from the valve seat increases as a result of spring compression. Generally, the force that is required to operate the manual pumping mechanism generates an in-line pressure that is sufficient to move the check valve into its open position. The pressure additionally ensures that the check valve will remain open during the entire flushing procedure.

It is not always desirable to incorporate a manual pumping mechanisms into the toilet. Often, the force necessary to operate a manual pumping mechanism results in the toilet being difficult for use by handicapped, elderly, arthritic or young individuals. It is for this reason that electrically or power assisted pumping mechanisms have become popular. In an electric or power assisted pumping mechanism, the pump operates off of a battery and, therefore, the power supply is limited. Previously, to enable these pumping mechanism to operate at flush water pressure levels which would provide for good flushing of the toilet without unduly draining the batteries, the check valved associated with the discharge nozzle was removed and the power assisted pumping mechanism was designed to incorporate other features which would prevent the flush water from inadvertently passing into the toilet bowl.

Instead, the present invention provides a check valve 56 which can be used with either a manually actuated, electric or power assisted pumping mechanism 32, while not unduly draining the batteries of the latter type. During production of the toilet 10, the features of the present invention eliminate the need for separate production lines at the manufacturing facility which are specific to the type of pumping mechanism 32 being installed. Additionally and contrary to prior practice, the present invention eliminates the need for a final quality assurance check to ensure that the power assisted pumping mechanism 32 is not installed in conjunction with a toilet 10 having a check valve at the discharge nozzle. It further eliminates the need to design the pumping mechanism 32 with its own built-in valve mechanism. The check valve 56 utilized with the present invention achieves all of the above while requiring less force to maintain it open than to initial cause it to open.

Figure 3:
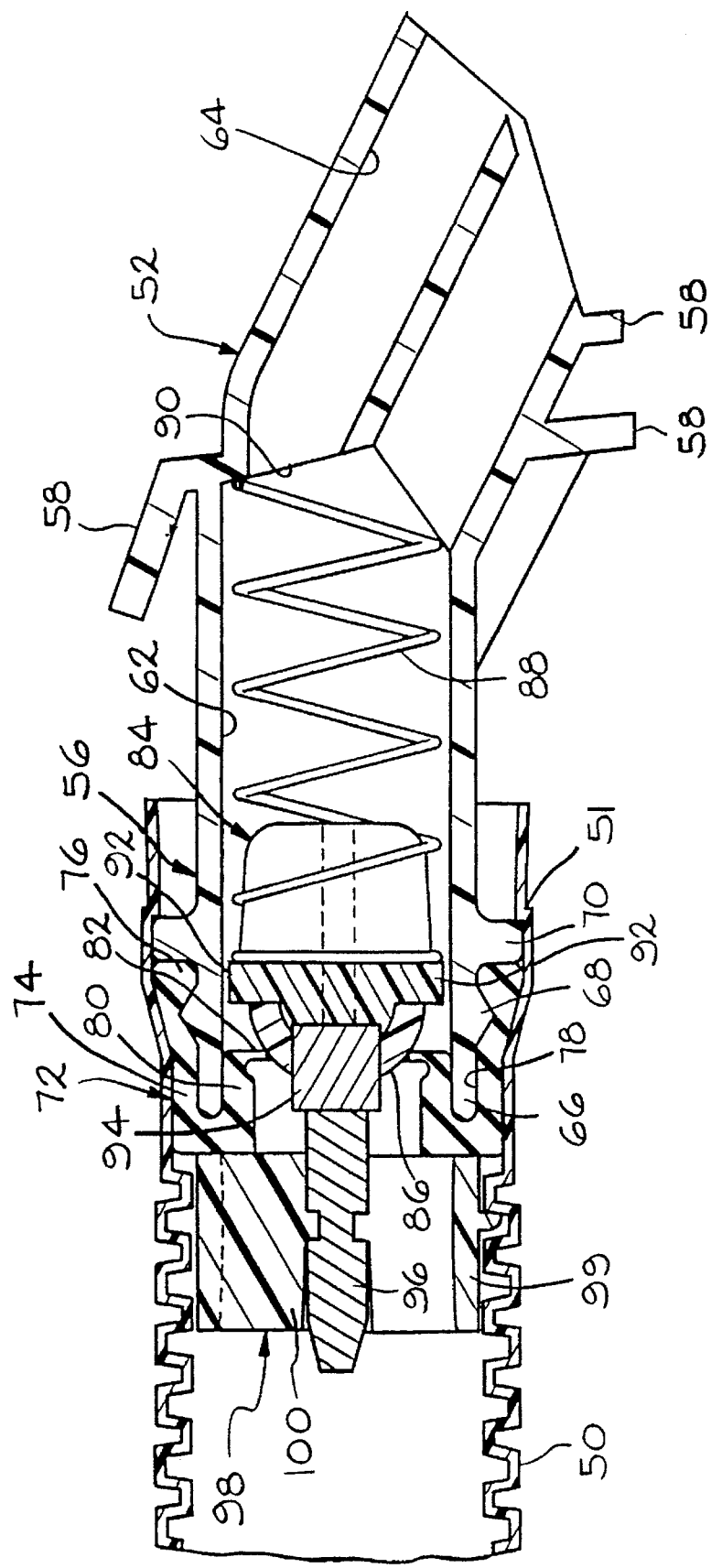
FIG. 3 is a cross sectional view of a closed check valve as utilized in a toilet embodying the principles of the present invention.
Figure 4:
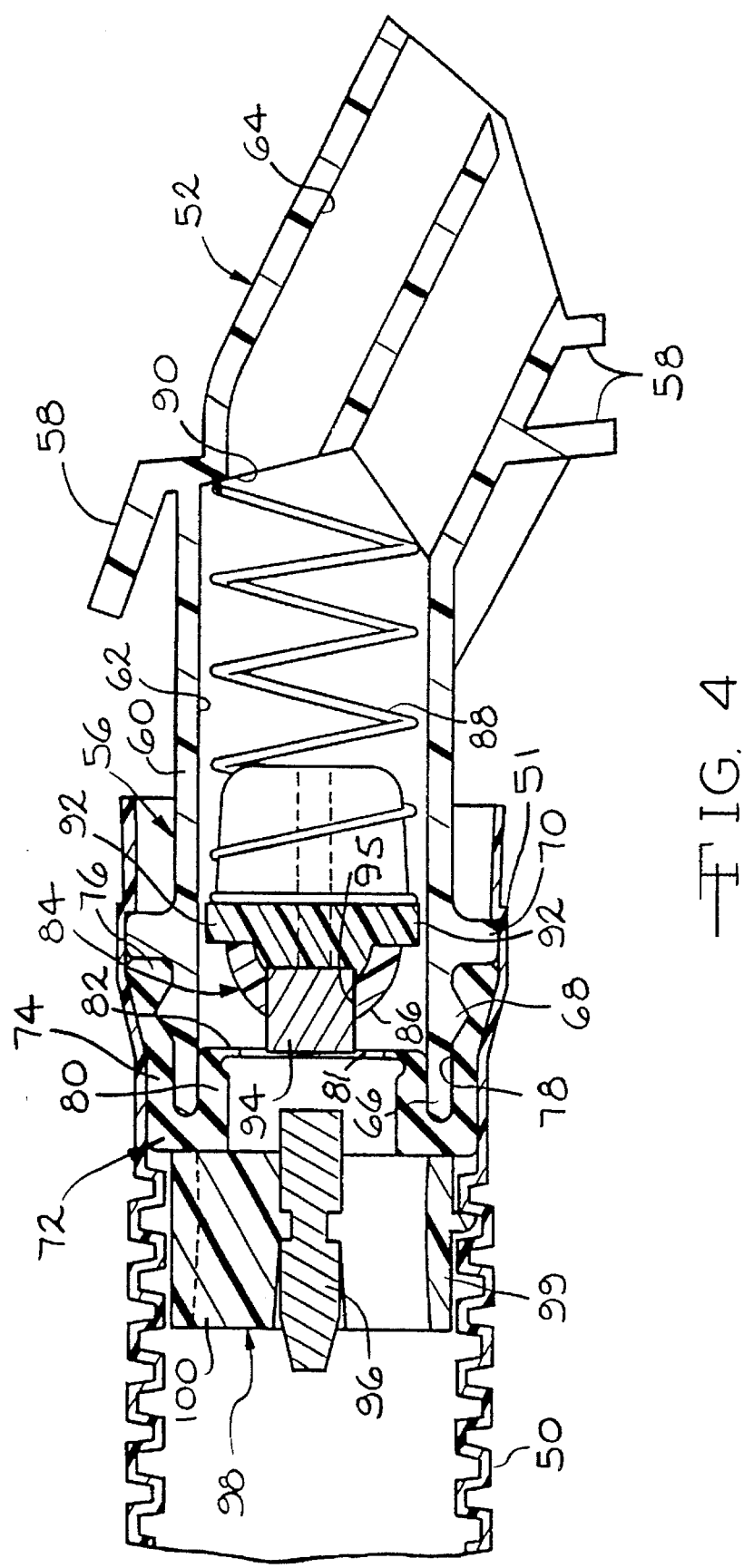
FIG. 4 is a cross sectional view of an open check valve as found in a toilet according to the principles of the present invention.

As seen in FIGS. 3 and 4, a portion of the check valve 56 is integrally or unitarily formed with the discharge nozzle 52. Of course, the check valve 56 could be constructed separate from the discharge nozzle 52 and position entirely or partially within the flush tube 50 without departing from the teachings of this invention.

Mounting flanges 58 secure the discharge nozzle 52 within an aperture (not shown) defined in the seat section 12 of the toilet 10. The nozzle 52 is oriented so that flush water discharged from the nozzle 52 will properly be directed into the bowl 16. Extending rearward or away from the mounting flanges 58, is a cylindrical extension or body 60 of the check valve 56. A bore or passageway 62 is defined in the check valve body 60 in communication with a passageway 64 similarly defined in the discharge nozzle 52. Adjacent to a distal end 66 of the body 60 (that end away from the discharge nozzle 52) and formed on the exterior thereof are a rib 68 and a collar 70 which circumferentially protrude around the body 60 and operate as a means for mounting a rubber boot or seal 72.

The valve seal 72 includes an annular groove 78 which divides the seal 72 into an outer skirt 74 and an inner skirt 80. The seal 72 is received or press fit onto the distal end 66 of the body 60 such that the terminal end 76 of the outer skirt 74 snaps over the rib 68 and its resiliency retains the seal 72 on the body 60. The collar 70 and the groove 78 cooperate to limit the depth to which the seal 72 can be pushed onto the body 60. When properly mounted, the seal 72 receives the distal end 66 of the body 60 in the groove 78 and the inner skirt 80 extends along the interior surfaces of the body 60 in the passageway 62. The inner skirt 80 terminates in a radially inward directed lip which defines an aperture 81 (FIG. 4), the region about which is referred to as the valve seat 82 of the check valve 56.

The flush tube 50 is also mounted onto the distal end 66 of the check valve body 60 generally over the skirt 82 of the seal 72. To ensure that the flush tube 50 is not inadvertently pulled off of or removed from the distal end 66 of the check valve 56, the flush tube 50 may be provided with a shoulder 51 that will snap over the collar 70. Clamps or other mechanisms could alternately be used to retain the flush tube 50 on the check valve 56.

When the check valve 56 is in its closed position, as seen in FIG. 3, a plunger 84 is sealingly engaged with the valve seat 82 and the passageway 62 through the check valve 56 is fully occluded. A semi-circular or hemispherical engagement surface 86 is formed on the plunger 84 to ensure that fluid tight contact is formed between the valve seat 82 and the plunger 84 when they are in their engaged position. Obviously, other shapes for the engagement surface 86 and the aperture defined by the valve seat 82 could be utilized so long as a fluid tight seal is produced.

The plunger 84 is free to axially move within the passageway 62 defined by the body 60 of the check valve 56. Also located within the passageway 62 is a valve spring 88 which, in the preferred embodiment, has the shape of a coil spring. One end of the valve spring 88 contacts a necked, reduced diameter or bent portion 90 of the passageway 62, generally adjacent to the passageway 64 of the discharge nozzle 52, while the opposing end of the valve spring 88 encircles a portion of the plunger 84 opposite of the engagement surface 86. The plunger 84 is provided with bosses 92 that prevent the plunger 82 from slipping into the interior of the spring 88. The bosses 92 cause the plunger 84 to be carried by the valve spring 88.

The valve spring 88 is a weak spring which only mildly biases the plunger 84 toward the valve seat 82. It is significant to note that the biasing force exhibited by the valve spring 88 is generally insufficient to maintain the plunger 84 in sealed engagement with the valve seat 82 so that flush water will be prevented from inadvertently passing through the check valve 56. Rather, the valve spring 88 functions to permit and ensure proper working of another primary or first biasing mechanism. This other biasing mechanism is responsible for ensuring that sealing engagement between the valve seat 82 and the plunger 84 is maintained during non-flush situations. It should also be noted that the passage 62 provides clearance for the spring 88 to move freely in the body 60.

The biasing mechanism which ensures sealing engagement of the plunger 84 with the valve seat 82 is generally positioned on the upstream side of the engagement surface 86 and includes a magnet 94, a striker pin 96 and a striker pin retainer 98. The magnet 94 and the striker pin 96 are mounted so as to be located generally along the axis defined by the passageway 62 through the body 60 of the check valve 56. In one embodiment, the magnet 94 is glued or otherwise secured in a cylindrical cavity 95 the engagement surface 86 of the plunger 84 while the striker pin 96 is carried in the striker pin retainer 98 which is glued or otherwise secured to the valve seal 72 upstream from the magnet 94. The retainer 98 includes an outer annulus 99 from which one or more, preferably three, radially inwardly directed vanes 100 extend to retain and position the striker pin 96 preferably in the center of the annulus 99 and in alignment with the magnet 94. The vanes 100 are equidistantly spaced about the opening defined by the annulus 99 and are spaced apart to provide significant open areas through which the flush water can flow in a substantially unimpeded manner. The striker pin 96 can be held in the retainer 98 by numerous methods including gluing or insert molding.

Because the magnet 94 and the striker pin 96, which is a ferrous material such as steel, are incorporated into the check valve 56, the valve spring 88 is not needed to force and ensure sealing engagement between the valve seat 82 and the plunger 84. Rather, this engagement is caused by the magnetic attraction between the magnet 94 and the striker pin 96. The purpose of the valve spring 88 is to bias the plunger 84 to that point where the magnet 94 is close enough to the striker pin 96 so that the magnetic attraction between the two will be great enough to cause the sealing engagement of the valve seat 82 with the engagement surface 86 of the plunger 84. Preferably, the magnet 94 and the striker pin 96 will be in contact with one another when sealing engagement is fully established.

In an alternative embodiment, the magnet 94 and striker pin 96 can be switched with the striker pin 96 being movably carried by the plunger 84 and the magnet 94 being carried by the retainer 98. Regardless of this switch in positioning, the check valve 56 works in the same way.

During operation of the toilet 10, an initial pressure of flush water is required to disengage the magnet 94 from the striker pin 96 and the plunger 84 from the valve seat 82. Once this engagement has been broken, as seen in FIG. 4, less pressure is required to maintain the check valve 56 open because the attraction between the magnet 94 and the striker pin 96 is reduced as the two separate and because the weak spring force is insufficient to cause engagement. As the pressure in the flush tube 50 decreases, the spring begins to bias the plunger 84 toward the valve seat 82 and, eventually, the magnetic attraction between the magnet 94 and the striker pin 96 again causes sealing engagement between the plunger 84 and valve seat 82.

While the above description constitutes the preferred embodiments of the present invention, it will be appreciated that the invention is susceptible to modification, variation and change without departing from the proper scope and fair meaning of the accompanying claims.

What is claimed is:

1. A toilet comprising a seat section that includes a bowl with a bottom discharge opening, said toilet also including a source of flush water for rinsing and removing waste from said bowl through said discharge opening, a pump to dispense said flush water, a conduit for delivering said flush water from said pump to a nozzle directing said flush water into said bowl, a check valve associated with the discharging of said flush water into said bowl to prevent inadvertent passing of said flush water into said bowl, said check valve including a body having a passageway for said flush water axially aligned between an inlet and an outlet, a valve seat located within said passageway and defining an orifice through which said flush water can flow, a plunger movably mounted for axial movement within said passageway between an engaged position where said plunger sealingly engages said valve seat to prevent the passage of said flush water through said check valve and a disengaged position where said plunger is disengaged from said valve seat and said flush water is permitted to pass through said check valve, biasing means for biasing said plunger into said engaged position with said valve seat, said biasing means including a magnet and a ferrous element both being located upstream of said valve seat, said magnet and said ferrous element exhibiting a first biasing force to maintain said plunger in said engaged position and prevent the inadvertent passage of flush water through said check valve, one of said magnet and said ferrous element being carried by said plunger and the other of said magnet and ferrous element being carried by a retainer, said retainer immovably positioning the other of said magnet and ferrous element centrally within said passageway, said retainer having portions permitting flush water to flow axially therepast, said biasing means also including a spring positioned within said passageway downstream of said valve seat, said spring exhibiting a second biasing force supporting said plunger within said passageway, said second biasing force being less than said first biasing force and being insufficient to cause engagement of said plunger and said valve seat so as to prevent the inadvertent passage of flush water through said check valve, said second biasing force operating to bias said plunger to position where said first biasing force moves said plunger into said engaged position.

2. A toilet as set forth in claim 1 wherein said magnet is mounted to said plunger and is movable therewith, said ferrous element being immovable with respect to said body.

3. A toilet as set forth in claim 1 wherein said magnet is generally located within said passageway.

4. A toilet as set forth in claim 1 wherein said body is integrally formed with said nozzle.

5. A toilet as set forth in claim 1 wherein said valve seat is press fit onto one end of said body.

6. A toilet as set forth in claim 1 wherein said valve seat retains said plunger within said body.

7. A toilet as set forth in claim 1 wherein said ferrous element is mounted to said plunger and is movable therewith, said magnet being immovable with respect to said body.

8. A toilet as set forth in claim 1 wherein said retained is an extension of said body and defines said inlet end said body.

* * * * *